US012664006B2

(12) United States Patent
Liu

(10) Patent No.: US 12,664,006 B2
(45) Date of Patent: Jun. 23, 2026

(54) METHOD, APPARATUS, DEVICE, COMPUTER-READABLE STORAGE MEDIUM AND PRODUCT FOR DISPLAYING CODE

(71) Applicant: Beijing Zitiao Network Technology Co., Ltd., Beijing (CN)

(72) Inventor: Jian Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 143 days.

(21) Appl. No.: 18/573,859

(22) PCT Filed: Jun. 9, 2022

(86) PCT No.: PCT/CN2022/097979
§ 371 (c)(1),
(2) Date: Dec. 22, 2023

(87) PCT Pub. No.: WO2023/279913
PCT Pub. Date: Jan. 12, 2023

(65) Prior Publication Data
US 2024/0296056 A1 Sep. 5, 2024

(30) Foreign Application Priority Data
Jul. 9, 2021 (CN) ......................... 202110776437.4

(51) Int. Cl.
G06F 3/048 (2013.01)
G06F 3/04817 (2022.01)
G06F 9/451 (2018.01)
(52) U.S. Cl.
CPC .......... G06F 9/451 (2018.02); G06F 3/04817 (2013.01)

(58) Field of Classification Search
None
See application file for complete search history.

(56) References Cited

U.S. PATENT DOCUMENTS 9,785,489 B1 * 10/2017 Chheda .............. G06F 9/45558
10,223,076 B1 3/2019 Owen et al.
(Continued)

FOREIGN PATENT DOCUMENTS

CN 103744782 A 4/2014
CN 104090836 B 4/2016
(Continued)

OTHER PUBLICATIONS https://www.youtube.com/watch?v=TUpsyv9A9vU (Inspecting a webpage HTML using developer tool in Chrome by Dimmick) (Year : 2020).*
(Continued)

*Primary Examiner* — Thanh T Vu
(74) *Attorney, Agent, or Firm* — Fish & Richardson P.C.

(57) ABSTRACT

Embodiments of the disclosure provide a method, apparatus, device, computer-readable storage medium and product for displaying code. The method includes: displaying, in a preset first display area, a screenshot interface of current display content of a target application software to be analyzed, and displaying at least one triggerable control in the screenshot interface; and in response to a triggering on a target triggerable control, displaying, in a preset second display area, code information corresponding to the triggered target triggerable control.

20 Claims, 6 Drawing Sheets

(56)     References Cited

U.S. PATENT DOCUMENTS

| | | | |
|---|---|---|---|
| 10,324,831 B1 | 6/2019 | Zhang et al. | |
| 2009/0089756 A1* | 4/2009 | Danton | G06F 11/3644 |
| | | | 717/124 |
| 2018/0107585 A1* | 4/2018 | Ramesh | G06F 8/443 |
| 2020/0073790 A1* | 3/2020 | Abhishek | G06F 11/3684 |

FOREIGN PATENT DOCUMENTS

| | | |
|---|---|---|
| CN | 108536607 A | 9/2018 |
| CN | 110069404 A | 7/2019 |
| CN | 110399067 A | 11/2019 |
| CN | 110489105 A | 11/2019 |
| CN | 111694758 A | 9/2020 |
| CN | 112416363 A | 2/2021 |
| CN | 112817582 A | 5/2021 |
| CN | 113377365 A | 9/2021 |
| CN | 113377366 A | 9/2021 |

OTHER PUBLICATIONS

International Search Report (with English translation) and Written Opinion issued in PCT/CN2022/097979, dated Sep. 8, 2022, 10 pages provided.

Zhi He Shi Jie, "Control positioning of WEB automated testing" is based on the unique control attribute positioning of HTML5 controls, https://baijiahao.baidu.com/s?id=1676325174646320023&wfr=spider&for=pc, Aug. 29, 2020, 14 pages.

Chinese Office Action, issued in Chinese patent application No. 202110776437.4, dated May 23, 2023, 25 pages (translation enclosed).

Magic Casson, Click DOM and VSCode will automatically open the corresponding React component?, dated Dec. 11, 2020, 14 pages.

Superyue, Holding hands leads you to use vue devtools, dated Aug. 24, 2020, 14 pages.

[No Author Listed], "Design and Implementation of Web Automation Testing System Based on Selenium," Jun. 2020, 63 pages (with English abstract).

Notification of Intent to Grant in Chinese Appln. No. 202110776437. 4, dated Jun. 19, 2023, 6 pages (with English translation).

* cited by examiner

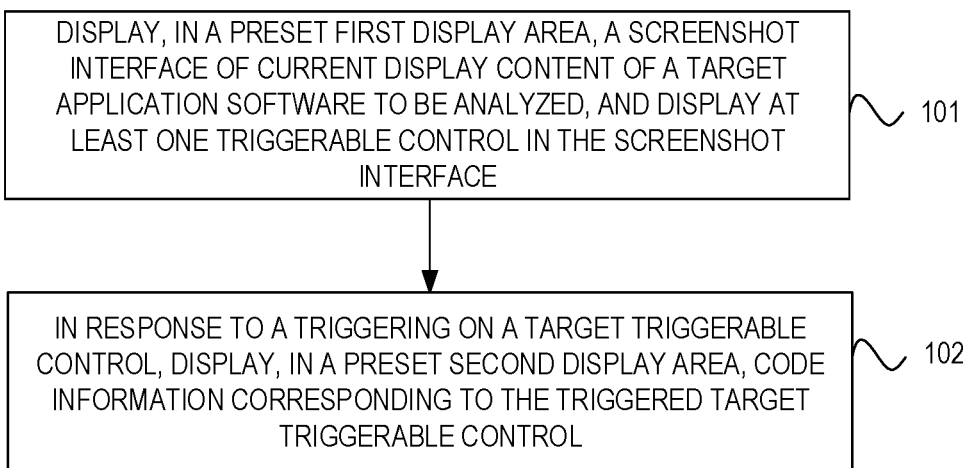

DISPLAY, IN A PRESET FIRST DISPLAY AREA, A SCREENSHOT INTERFACE OF CURRENT DISPLAY CONTENT OF A TARGET APPLICATION SOFTWARE TO BE ANALYZED, AND DISPLAY AT LEAST ONE TRIGGERABLE CONTROL IN THE SCREENSHOT INTERFACE          101

IN RESPONSE TO A TRIGGERING ON A TARGET TRIGGERABLE CONTROL, DISPLAY, IN A PRESET SECOND DISPLAY AREA, CODE INFORMATION CORRESPONDING TO THE TRIGGERED TARGET TRIGGERABLE CONTROL          102

FIG. 1

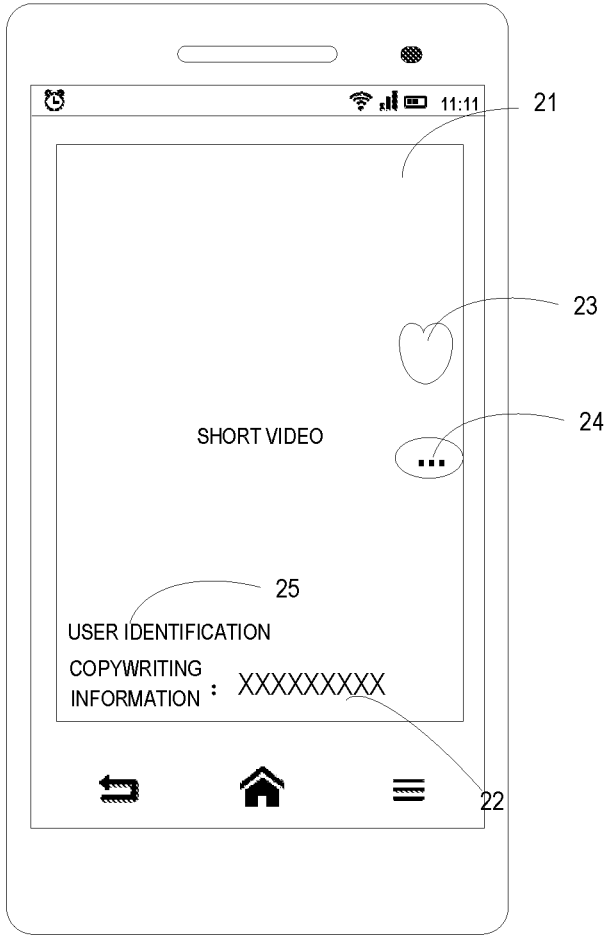

FIG. 2

RUN A PLURALITY OF PIECES OF PRE-EMBEDDED ANALYZING CODE BASED ON THE TRIGGERING OPERATION ~ 501

DETERMINE POSITION OF CODE INFORMATION OF A FUNCTION CORRESPONDING TO RESPECTIVE TRIGGERABLE CONTROLS BY FUNCTION CALL STACK WHILE RUNNING THE PLURALITY OF PIECES OF ANALYZING CODE ~ 502

METHOD, APPARATUS, DEVICE, COMPUTER-READABLE STORAGE MEDIUM AND PRODUCT FOR DISPLAYING CODE

CROSS REFERENCE

This application is a 371 national stage application of PCT Application No. PCT/CN2022/097979, filed on Jun. 9, 2022, which claims priority to Chinese Patent Application No. 202110776437.4, filed on Jul. 9, 2021. The disclosures of the aforementioned applications are hereby incorporated by reference in their entireties.

FIELD

Embodiments of the present disclosure relate to the field of computer technology, in particular to a method, apparatus, device, computer-readable storage medium and product for displaying code.

BACKGROUND

In the process of developing an application software, in order to realize the processing operation of the User Interface Design (UI) control on the interface corresponding to the application software, developers often need to locate and obtain the code corresponding to the UI control.

SUMMARY

Embodiments of the present disclosure provide a method, apparatus, device, computer-readable storage medium and product for displaying code, to solve the technical problems of low efficiency caused by manual code locating and obtaining, and high professional requirements for developers.

In a first aspect, embodiments of the present disclosure provide a method of displaying code, including:

displaying, in a preset first display area, a screenshot interface of current display content of a target application software to be analyzed, and displaying at least one triggerable control in the screenshot interface, the triggerable control corresponding to a target control in an interactive interface of the current display content of the target application software; and in response to a triggering on a target triggerable control, displaying, in a preset second display area, code information corresponding to the triggered target triggerable control, wherein the target triggerable control is any triggerable control in the at least one triggerable control.

In a second aspect, embodiments of the present disclosure provide an apparatus for processing and displaying code, including:

a display module configured to display, in a preset first display area, a screenshot interface of current display content of a target application software to be analyzed, and display at least one triggerable control in the screenshot interface, the triggerable control corresponding to a target control in an interactive interface of the current display content of the target application software; and a processing module configured to in response to a triggering on a target triggerable control, display, in a preset second display area, code information corresponding to the triggered target triggerable control, wherein the target triggerable control is any triggerable control in the at least one triggerable control.

In a third aspect, embodiments of the present disclosure provide an electronic device, including: at least one processor and a memory:

wherein the memory stores a computer executable instruction;

wherein the at least one processor executes the computer executable instruction stored in the memory, causing the at least one processor executes the method of displaying code of the above first aspect and various possible designs of the first aspect.

In a fourth aspect, embodiments of the present disclosure provide a computer-readable storage medium, wherein the computer-readable storage medium stores thereon a computer executable instruction which, when executed by a processor, implement the method of displaying code of the above first aspect and various possible designs of the first aspect.

In a fifth aspect, embodiments of the present disclosure provide a computer program product, including a computer program which, when executed by a processor, implement the method of displaying code of the above first aspect and various possible designs of the first aspect.

In a sixth aspect, embodiments of the present disclosure provide a computer program wherein the computer program, when executed by a processor, implement the method of displaying code of the above first aspect and various possible designs of the first aspect.

The present embodiments provide a method, apparatus, device, computer-readable storage medium and product for displaying code. In the method, after obtaining a user's triggering operation on a data processing control, a screenshot interface of current display content of a target application software to be analyzed and at least one triggerable control is displayed in a preset first display area. Based on the user's triggering operation on the target triggerable control, the code information corresponding to the target triggerable control is displayed in a preset second display area, so that the code information of the target triggerable control currently triggered by the user can be quickly located and obtained, and the efficiency of obtaining code can be improved. In addition, the code information is located and obtained by means of interface interaction.

BRIEF DESCRIPTION OF THE DRAWINGS

In order to more clearly explain the embodiments of the present disclosure or the technical solutions in the prior art, in the following, the drawings that need to be used in the description of the embodiments or the prior art will be introduced briefly. Obviously, the drawings in the following description are only some embodiments of the present application. For those of ordinary skill in this field, other drawings can be obtained according to these drawings without any creative labor.

FIG. 1 is a schematic flowchart of a method of displaying code provided by embodiment 1 of the present disclosure;

FIG. 2 is a schematic diagram of an interface of a target application software provided by an embodiment of the present disclosure;

DETAILED DESCRIPTION

Figures 3, 4:
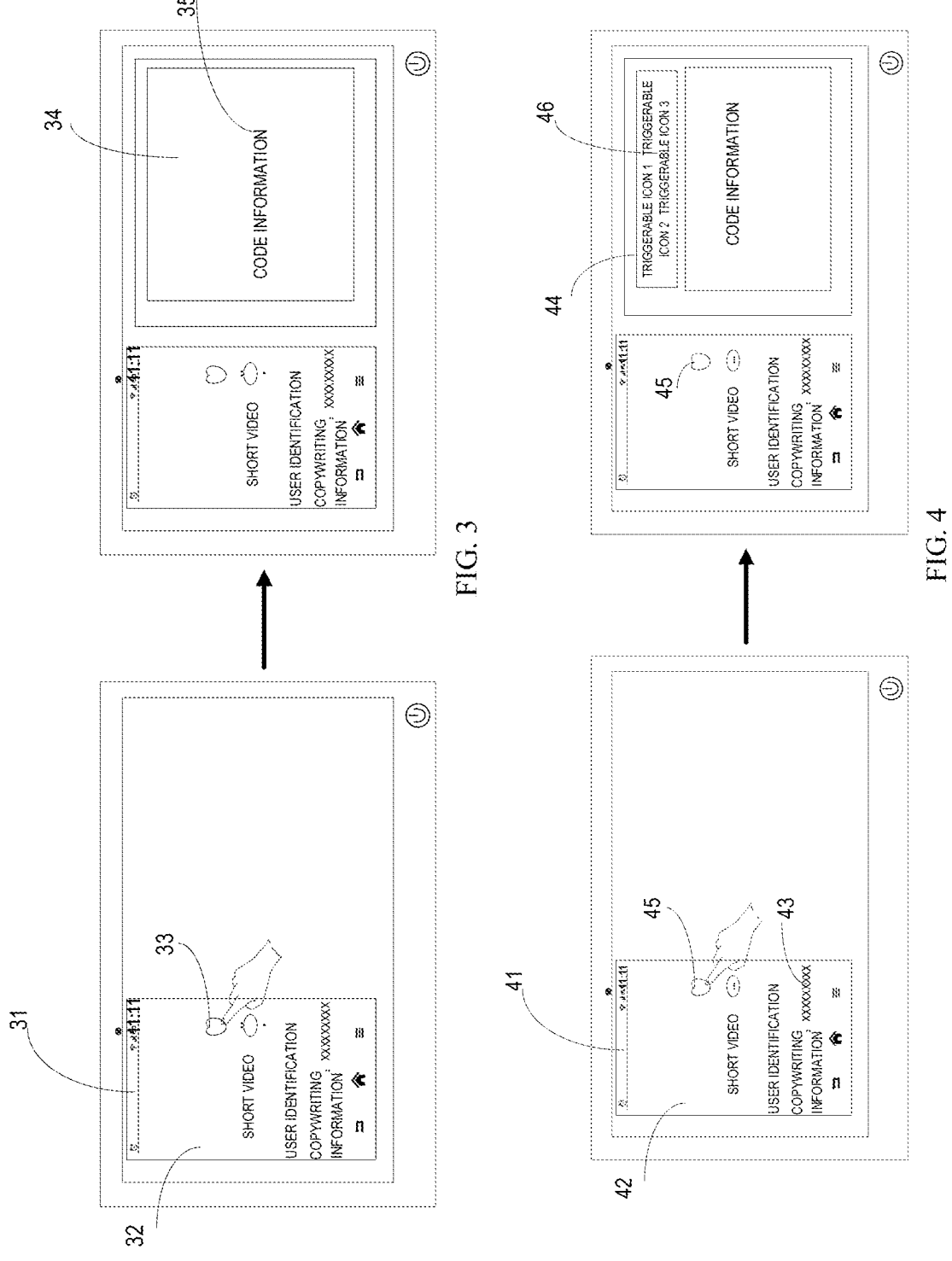
FIG. 3 is a diagram of interface interaction provided by an embodiment of the present disclosure.
FIG. 4 is another diagram of interface interaction provided by an embodiment of the present disclosure.

In order to make the purpose, technical solutions and advantages of the embodiments of the present disclosure more clear, the technical solutions in the embodiments of the present disclosure will be clearly and completely described below in conjunction with the drawings in the embodiments of the present disclosure. Obviously, the described embodiments are only a portion of the embodiments of the present disclosure and not all embodiments. Based on the embodiments of the present disclosure, all other embodiments obtained by ordinary skilled in the field without creative labor are within the scope of the protection of the present disclosure.

The present disclosure provides a method, apparatus, device, computer-readable storage medium and product for displaying code in response to the above mentioned technical problems of low efficiency caused by manual code locating and obtaining, and high professional requirements for developers.

It should be noted that the method, apparatus, device, computer-readable storage medium and product for displaying code provided by embodiments of the present disclosure can be used in a variety of scenarios of code locating and obtaining.

In order to realize the locating and obtaining operation to the code, in the prior art, generally, code can only be manually located based on the understanding of the code by the developer. However, since the code corresponding to an application software often needs to be written by multiple developers, and the writing habits of different developers are also different, the locating for code often requires higher requirements for developers, and because the volume of code is large, manual methods for locating code are often less efficient.

Because the display interface of the application software includes a number of target controls, in order to achieve the editing, modifying and other operations on the target control, it is necessary to locate and obtain the code information of the target control. Generally, the existing method of locating code is to analyze the code and manually obtain the code of the target control by the developer based on personal experience. The efficiency is usually low, and the requirements for developers are higher.

In the present disclosure, in order to achieve rapid obtaining of the code of the target control, after obtaining a user's triggering operation on a data processing control, a screenshot interface of current display content of a target application software to be analyzed and at least one triggerable control is displayed in a preset first display area. Based on a user's triggering operation on the target triggerable control, code information corresponding to the target triggerable control is displayed in a preset second display area.

FIG. 1 is a schematic flowchart of a method of displaying code provided by embodiment 1 of the present disclosure, as shown in FIG. 1, the method includes:

Step 101, display, in a preset first display area, a screenshot interface of current display content of a target application software to be analyzed, and display at least one triggerable control in the screenshot interface, the triggerable control corresponding to a target control in an interactive interface of the current display content of the target application software.

The execution body of the present embodiment is an apparatus for processing and displaying code, which can be coupled to a terminal device, so that the code information corresponding to the target triggerable control selected by a user can be located and displayed based on the interface interaction operation by the user.

Alternatively, the apparatus for processing and displaying code can also be coupled to a server, and the server can communicatively connected to the terminal device. Therefore, based on the interface interaction operation between the user and the terminal device, the target triggerable control selected by the user can be determined, and the code information corresponding to the target triggerable control can be obtained and sent to the terminal device for display.

In the present embodiment, there can be a plurality of target controls in the interactive interface of the current display content of the target application software to be analyzed, and the target control can realize the interactive operation on the current display content. In order to facilitate the user to view the code, a data processing control can be set on the display interface. In response to the user's triggering operation on the data processing control, a screenshot interface of the current display content of the target application software to be analyzed can be displayed on the display interface and at least one triggerable control can be displayed in the screenshot interface. The triggerable control corresponds to the target control in the interactive interface of the current display content of the target application software to realize the editing of the target control and the locating of the code. Specifically, the above screenshot interface and triggerable control can be displayed in the first display area within the display interface.

Step 102, in response to a triggering on a target triggerable control, display, in a preset second display area, code information corresponding to the triggered target triggerable control, wherein the target triggerable control is any triggerable control in the at least one triggerable control.

In the present embodiment, the user can select from a plurality of triggerable controls currently displayed based on the actual needs to determine the target trigger control. Accordingly, in response to the user's triggering operation on the target triggerable control, the code information corresponding to the target triggerable control can be obtained. In addition, the code information corresponding to the target triggerable control can be displayed in the preset second display area, and the target triggerable control is any triggerable control in the at least one triggerable control.

Specifically, the triggering operation can be any one of the triggering methods, such as click, double click, long press, etc., which is not restricted in the present disclosure. In addition, the first display area and the second display area can be a horizontal layout, or a vertical layout.

Alternatively, the first display area can be the same as the second display area. Or, in order to improve the user's experience of viewing the code information, the displaying area of the first display area and the second display area can be adjusted based on the user's adjustment operation, which is not restricted in the present disclosure.

FIG. 2 is a schematic diagram of an interface of a target application software provided by an embodiment of the present disclosure. As shown in FIG. 2, taking the short video application software as an example of the target application software, the display interface 21 of the short video application software has a plurality of target controls. For example, the target controls may include a copywriting control 22, a like control 23, a comment control 24, a user identification control 25, etc.

FIG. 3 is a diagram of interface interaction provided by an embodiment of the present disclosure. As shown in FIG. 3, in response to the user's triggering operation on the target triggerable control 33 in the screenshot interface 32 in the first display area 31, the code information 35 corresponding to the target triggerable control 33 can be displayed in the second display area 34.

The present embodiment provides a method of displaying code, in the method, after obtaining the user's triggering operation on the data processing control, a screenshot interface of current display content of a target application software to be analyzed and at least one triggerable control is displayed in a preset first display area. Based on the user's triggering operation on the target triggerable control, the code information corresponding to the target triggerable control is displayed in the preset second display area, so that the code information of the target triggerable control currently triggered by the user can be quickly located and obtained, and the efficiency of obtaining code can be improved. In addition, locating and obtaining code information by means of interface interaction can be more convenient and efficient to achieve code locating.

Further, based on embodiment 1, before step 101, the method further includes:

in response to an analyzing instruction for the target application software to be analyzed, obtaining target code of the target application software.

In the present embodiment, an analyzing button can also be set on the display interface, and the user can initiate the analyzing instruction by triggering the analyzing button to realize the next step of viewing the target code of the target application software. Specifically, in response to the user's analyzing instruction for the target application software to be analyzed, the target code of the target application software can be obtained.

Further, based on embodiment 1, step 101 specifically includes:

in response to a triggering on a preset data processing control, obtaining the interactive interface of the current display content of the target application software and location information of the target control on the interactive interface; and displaying, in the preset first display area, the screenshot interface of the current display content of the target application software to be analyzed, and displaying the at least one triggerable control in the screenshot interface based on the interactive interface and the location information of the target control.

In the present embodiment, after obtaining the user's triggering operation on the preset data processing control, the interactive interface of the current display content of the target application software can be obtained based on the triggering operation. Specifically, the current display content of the target application software can be screenshotted to obtain the screenshot interface corresponding to the interactive interface. Further, the location information of the target control on the interactive interface can also be determined, and the location information of target control can be expressed by the coordinate position. Therefore, after obtaining the interactive interface and the location information of the target control, the screenshot interface of the current display content of the target application software to be analyzed can be displayed in the preset first display area and the at least one trigger control can be displayed in the screenshot interface based on the interactive interface and the location information of the target control.

Further, based on embodiment 1, after step 101, the method further includes:

displaying, in a preset third display area, at least one triggerable icon corresponding to the target triggerable control, the each triggerable icon corresponding to operation code of a preset type of the target triggerable control.

In the present embodiment, the code information corresponding to the target triggerable control may be of different preset types, and the preset types include a code declaration type, a click event type, a layout file type, etc.

Therefore, in order for the user to further understand the code information of the preset type of concern, the at least one triggerable icon corresponding to the target triggerable control displayed in the preset third display area changes from a non-triggerable state to a triggerable state. The each triggerable icon corresponds to the operation code of the preset type of the target triggerable control. In one embodiment, the type of the triggerable icon on the interface is fixed. When the user triggers the target triggerable control, the triggerable icon corresponding to the target triggerable control becomes highlighted, indicating that it is a triggerable state. Clicking the triggerable icon in the highlighted state can jump to the code of the corresponding type, and the triggerable icon that is not associated with the target triggerable control still remains non-triggerable state. In other embodiments, the type of the triggerable icon displayed on the interface can change depending on the target triggerable control being triggered.

Further, in response to a triggering on at least one triggerable icon corresponding to the target triggerable control, the operation code corresponding to the triggerable icon can be displayed in the second display area.

FIG. 4 is another diagram of interface interaction provided by an embodiment of the present disclosure. As shown in FIG. 4, a screenshot interface 42 of current display content of the target application software to be analyzed can be displayed in a preset first display area 41, and at least one triggerable control 43 can be displayed in the screenshot interface 42, and at least one triggerable icon corresponding to the target triggerable control 45 triggered by a user can be displayed in the third display area 44. The triggerable icon 46 corresponds to operation code of a preset type of the target triggerable control. The preset type includes a code declaration type, a click event type, a layout file type, etc.

Further, based on embodiment 1, step 102 specifically includes:

in response to the triggering on the target triggerable control in the screenshot interface, displaying, in the preset second display area, the code information corresponding to the target triggerable control, or, Alternatively, step 102 specifically includes:

in response to the triggering on the target triggerable control in the screenshot interface, determining whether a target triggerable icon is triggered;

in response to a determination that the target triggerable icon is triggered, displaying, in the preset second display area, the operation code of the preset type corresponding to the target triggerable control.

In the present embodiment, the user can view the code information corresponding to the target triggerable control through the triggering operation on the target triggerable control. Specifically, in response to the user's triggering operation on the target triggerable control in the screenshot interface, the code information corresponding to the target triggerable control can be displayed in the preset second display area.

Alternatively, after obtaining the user's triggering operation on the target triggerable control, whether the target triggerable icon corresponding to the target triggerable control is triggered can be determined firstly. When the target triggerable icon is triggered, the operation code of the preset type corresponding to the target triggerable control can be accurately displayed in the preset second display area.

In the method of displaying code provided by the present embodiment, at least one triggerable icon corresponding to the target triggerable control is displayed in the preset third display area, so that the operation code corresponding to the target triggerable icon can be displayed in the second display area in response to the user's triggering operation on at least one triggerable icon corresponding to the target triggerable control. Therefore, the user can view the operation code of different preset types, which enables the user to view the preset code more conveniently.

Figure 5:
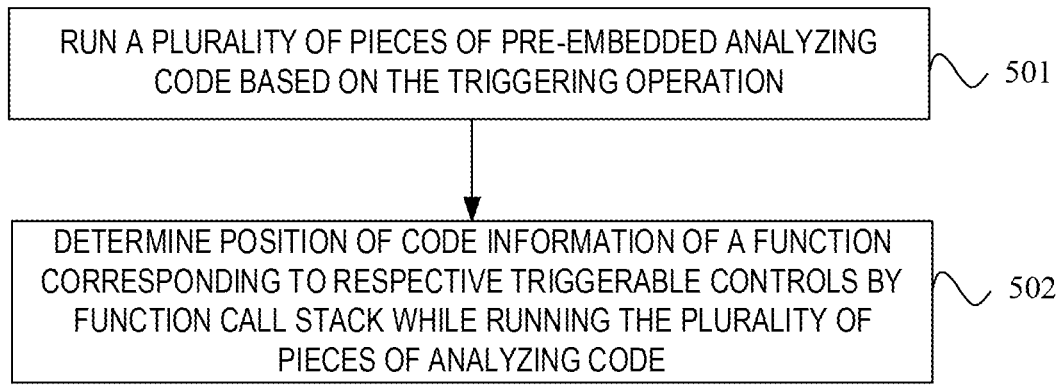
FIG. 5 is a schematic flowchart of a method of displaying code provided by embodiment 2 of the present disclosure.

FIG. 5 is a schematic flowchart of a method of displaying code provided by embodiment 2 of the present disclosure. Based on embodiment 1, after step 101, the method further includes:

Step 501, run a plurality of pieces of pre-embedded analyzing code based on the triggering operation.

Step 502, determine position of code information of a function corresponding to respective triggerable controls by function call stack while running the plurality of pieces of analyzing code.

In the present embodiment, in order to achieve the operation of obtaining the code information corresponding to respective triggerable controls, the analyzing code can be pre-embedded in the code. Therefore, after the user's triggering operation on the data processing control is obtained, a plurality of pieces of pre-embedded analyzing code can be run based on the triggering operation. Specifically, location of code information of a triggerable function corresponding to respective triggerable controls can be determined by function call stack while running the analyzing code. Based on the location of the code information corresponding to respective triggerable controls, the code information of the functions corresponding to respective triggerable controls can be obtained and stored, so that after obtaining the user's triggering operation on the target triggerable control subsequently, the code information corresponding to the target triggerable control can be obtained from the code information of the functions corresponding to the stored respective triggerable controls.

Further, based on any of the above embodiments, step 102 specifically includes:

in response to the triggering on the target triggerable control, sending a broadcast instruction to a preset software development kit to cause the software development kit to obtain the code information corresponding to the target triggerable control based on the broadcast instruction.

In the present embodiment, obtaining the code information can be performed specifically by the preset software development kit. Specifically, after obtaining the user's triggering operation on the target triggerable control, a plug-in unit can obtain the screenshot interface of the current content and send a broadcast instruction to the preset software development kit based on the screenshot interface.

Therefore, after obtaining the broadcast instruction, the software development kit can obtain the information corresponding to all interactive controls on the screenshot interface based on the broadcast instruction. Specifically, the software development kit can serialize the location of code information obtained while running the analyzing code that are pre-embedded previously, and output it to a command line, and return the command line to the preset plug-in unit. The preset plug-in will parse content of the command line, recover the application software runtime information, and obtain the screenshot of the current display content of the application software. The screenshot corresponds to the application software runtime information, and the triggerable control is generated. Therefore, when the user triggers the triggerable control, the preset plug-in unit will search the file information and line number information provided by the application through the file interface to open the file, that is, jump to the line number corresponding to the code.

Further, based on any of the above embodiments, step 102 specifically includes:

in response to the triggering on the target triggerable control, obtaining and displaying the code information corresponding to the target triggerable control based on the position of the code information of the function corresponding to the target triggerable control.

In the present embodiment, the triggerable control can correspond to functions of a plurality of preset types in the code, therefore, in response to the triggering on the target triggerable control, the code information corresponding to the target triggerable control can be obtained and displayed based on the position of the code information of the function corresponding to the target triggerable control.

Further, based on any of the above embodiments, after step 101, the method further includes:

displaying, in a fourth display area, an icon of function corresponding to the target control.

In the present embodiment, on the one hand, the user can obtain and view the code information through the triggering operation of the triggerable control. On the other hand, because the triggerable control can respectively correspond to the icon of function in the fourth display area, the code information can also be obtained and viewed through the triggering operation on the function icon, that is, triggering the triggerable control in the screenshot interface has the same effect as triggering the icon a corresponding function.

Specifically, icons of functions corresponding to the current respective target controls can be displayed in the preset fourth display area.

Further, based on any of the above embodiments, step 102 specifically includes:

in response to the triggering on any icon of function, displaying, in the second display area, the code information corresponding to the icon of function.

In the present embodiment, the user can select the icon of function that needs to be viewed from a plurality of icons of functions currently displayed to trigger based on actual needs. In response to the user's triggering operation on any icon of function, the code information corresponding to the icon of function is displayed in the second display area. Specifically, the code information corresponding to respective triggerable functions can be obtained and stored by running a plurality of pieces of pre-embedded analyzing code, and the code information corresponding to the icon of function triggered by the user can be obtained from the stored code information for display.

Figure 6:
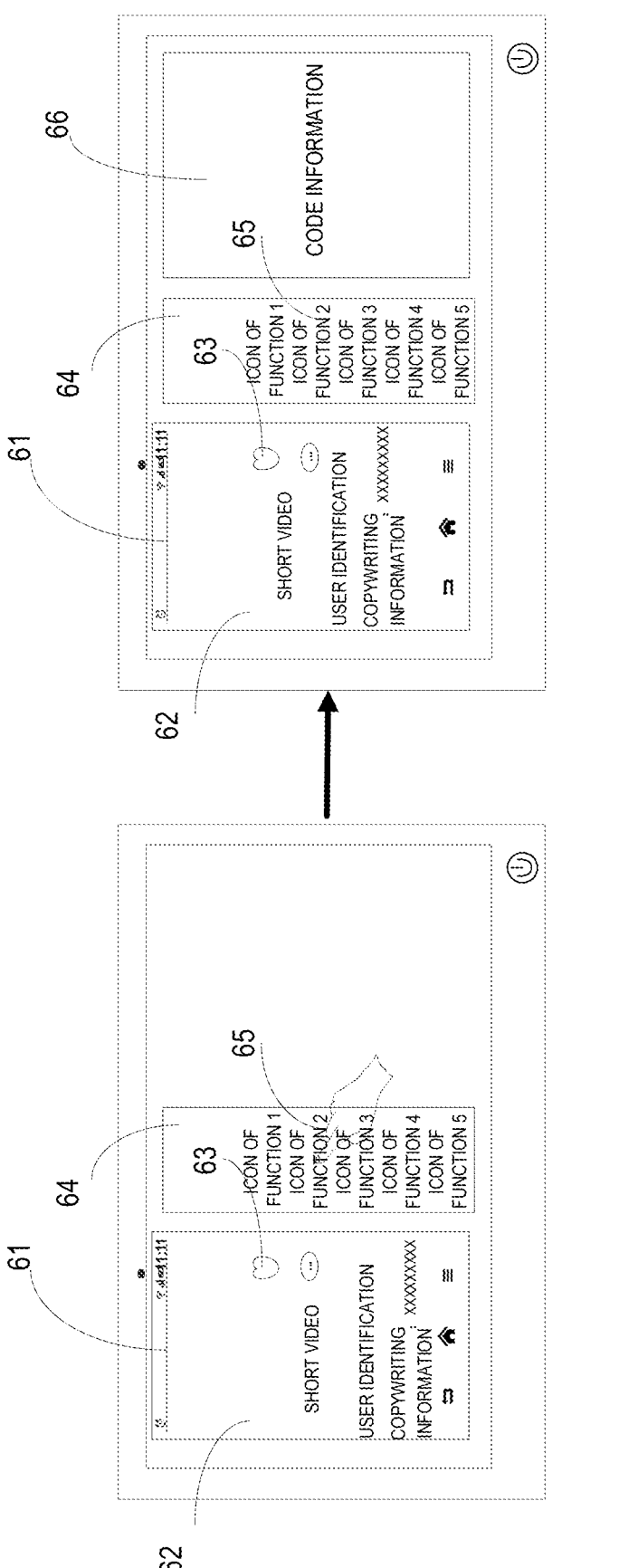
FIG. 6 is yet another schematic diagram of interface interaction provided by an embodiment of the present disclosure.

FIG. 6 is yet another schematic diagram of interface interaction provided by an embodiment of the present disclosure. As shown in FIG. 6, a screenshot interface 62 of current display content of the target application software to be analyzed in a preset first display area 61, and at least one triggerable control 63 can be displayed in the screenshot interface 62, and an icon of function 64 corresponding to the target control can be displayed in a fourth display area, and the triggerable control corresponds to the triggerable control one by one. In response to the triggering operation on any icon of function 64, the code information 66 corresponding to the icon of function 65 can be displayed in the second display area.

In the method of displaying code provided by the present embodiment, icons of functions for triggerable functions corresponding to the current respective target controls in the are displayed in the preset fourth display area, and the code information corresponding to the icon of function is displayed in the second display area in response to the user's triggering operation on any icon of function. Therefore, on the basis of realizing the code view by means of interface interaction, more diversified code view operations can be provided to the user to improve the user experience.

Further, based on any of the above embodiments, after step 102, the method further includes:

in response to a code modification instruction triggered by a user, storing modified code information to a preset storage path.

In the present embodiment, after obtaining the code information corresponding to the target triggerable control, on the one hand, the user can view the code information, and on the other hand, the user can modify the code information. Accordingly, the apparatus for processing and displaying code can obtain the code modification instruction triggered by the user, modify the code information based on the code modification instruction, and store the modified code information to the preset storage path.

In the method of displaying code provided by the present embodiment, by displaying and modifying the code information, the optimization and editing operation on the code information can be quickly realized and the efficiency of code maintenance is improved.

Further, based on any of the above embodiments, after step 102, the method further includes:

in response to a triggering on a preset editing button, displaying a control editing interface corresponding to the target triggerable control on a display interface, the control editing interface including a property to be edited corresponding to the target triggerable control;

obtaining editing data input in the control editing interface and generating an editing instruction based on the editing data; and performing a property editing operation on the target triggerable control based on the editing instruction.

In the present embodiment, the editing button can be set on the display interface in order to enable the user to edit the target control capable of being edited by means of interface interaction. The user can trigger the editing button, and in response to the triggering operation, the control editing interface corresponding to the target triggerable control triggered by the user can be displayed on the display interface. The editing interface of the control can include the editable properties corresponding to the target triggerable control. Alternatively, the control editing interface can include all editable properties corresponding to the target triggerable control. After the control editing interface is displayed on the display interface, the user can input editing data in the area corresponding to the corresponding editable properties in the control editing interface, so that an apparatus for control editing can generate editing instructions based on the editing data input by the user. The apparatus for control editing can edit the properties of the target triggerable control based on the editing data in the editing instruction.

Figure 7:
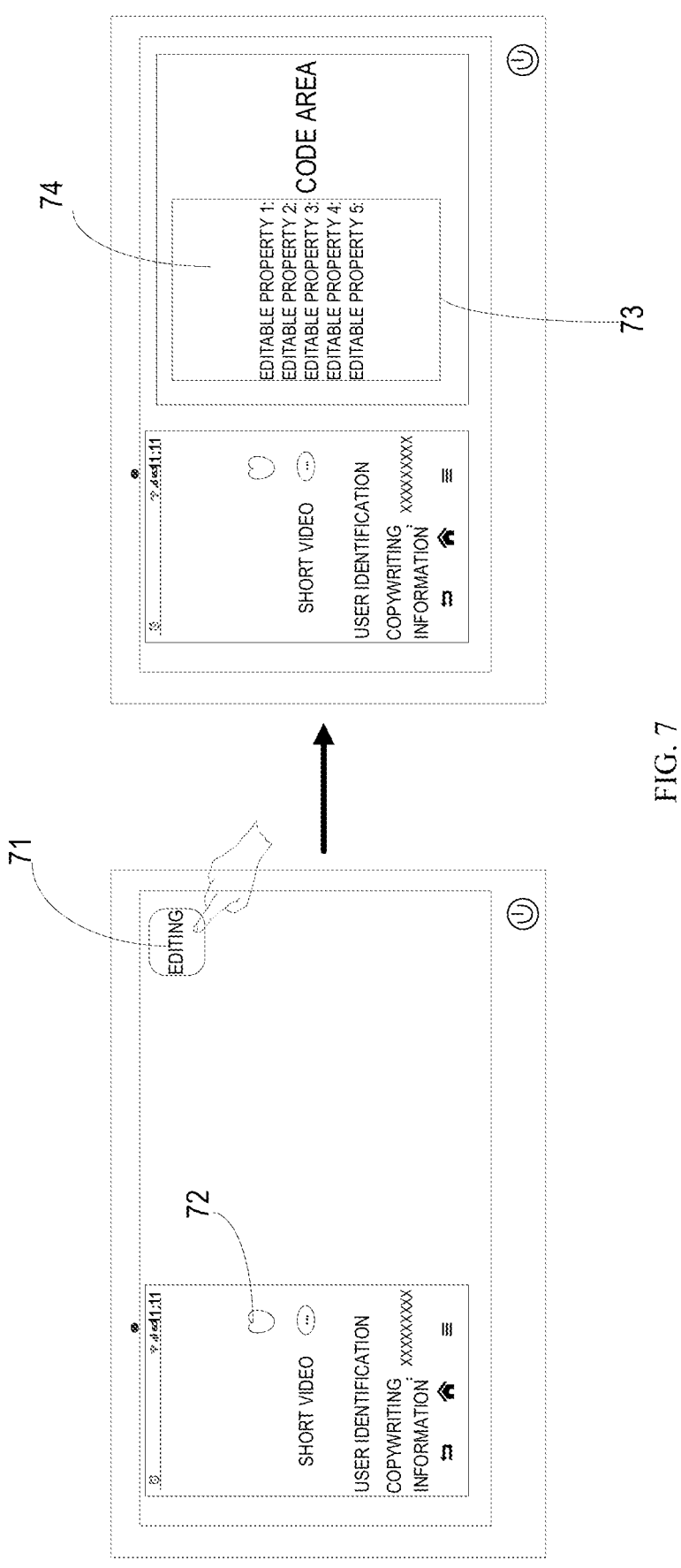
FIG. 7 is yet another diagram of interface interaction provided by an embodiment of the present disclosure.

FIG. 7 is yet another diagram of interface interaction provided by an embodiment of the present disclosure. As shown in FIG. 7, in response to the triggering on a preset editing button 71, a control editing interface 73 corresponding to a target triggerable control 72 can be displayed on the display interface, and the control editing interface 73 includes editable properties 74 corresponding to the target triggerable control 72.

In the method of displaying code provided by the present embodiment, because the control editing interface can include the editable properties corresponding to the target triggerable control, the user can realize the editing operation on the properties of the target triggerable control by means of interface interaction. Further, when the control editing interface includes all the editable properties corresponding to the target triggerable control, the user can realize the editing operation on all properties of the target triggerable control by means of interface interaction in one time, which effectively improves the efficiency of control editing.

Figure 8:
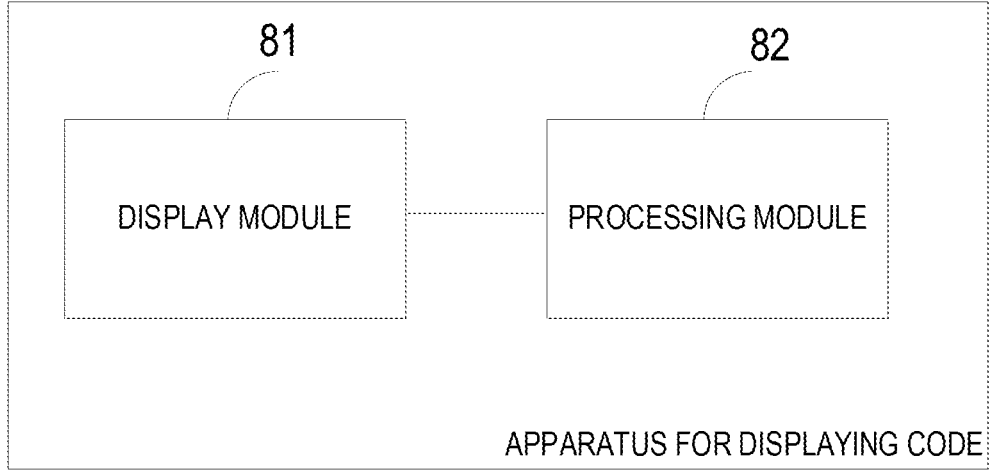
FIG. 8 is a structural schematic diagram of an apparatus for processing and displaying code provided by embodiment 3 of the present disclosure.

FIG. 8 is a structural schematic diagram of an apparatus for processing and displaying code provided by embodiment 3 of the present disclosure. As shown in FIG. 8, the apparatus includes: a display module 81 and a processing module 82, and the display module 81 is configured to display, in a preset first display area, a screenshot interface of current display content of a target application software to be analyzed, and display at least one triggerable control in the screenshot interface, the triggerable control corresponding to a target control in an interactive interface of the current display content of the target application software:

The processing module 82 is configured to in response to a triggering on a target triggerable control, display, in a preset second display area, code information corresponding to the triggered target triggerable control, wherein the target triggerable control is any triggerable control in the at least one triggerable control.

Further, based on embodiment 3, the apparatus further includes: an obtaining module configured to in response to an analyzing instruction for the target application software to be analyzed, obtain target code of the target application software.

Further, based on any of the above embodiments, the display module is configured to: in response to a triggering on a preset data processing control, obtain the interactive interface of the current display content of the target application software and location information of the target control on the interactive interface; and display, in the preset first display area, the screenshot interface of the current display content of the target application software to be analyzed, and display the at least one triggerable control in the screenshot interface based on the interactive interface and the location information of the target control.

Further, based on any of the above embodiments, the apparatus further includes: the display module, which is further configured to display, in a preset third display area, at least one triggerable icon corresponding to the target triggerable control, the each triggerable icon corresponding to operation code of a preset type of the target triggerable control.

Further, based on any of the above embodiments, the processing module is further configured to: in response to the triggering on the target triggerable control in the screenshot interface, display, in the preset second display area, the code information corresponding to the target triggerable control, or the processing module is further configured to: in response to the triggering on the target triggerable control in the screenshot interface, determine whether a target triggerable icon is triggered: in response to a determination that the target triggerable icon is triggered, display, in the preset second display area, the operation code of the preset type corresponding to the target triggerable control, the target triggerable icon being associated with the preset type.

Further, based on any of the above embodiments, the preset type includes one or more of a code declaration type, a click event type, or a layout file type.

Further, based on any of the above embodiments, the apparatus further includes: a running module configured to run a plurality of pieces of pre-embedded analyzing code based on the triggering operation: a determining module configured to determine position of code information of a triggerable function corresponding to respective triggerable controls by function call stack while running the plurality of pieces of analyzing code.

Further, based on any of the above embodiments, the processing module is configured to: in response to the triggering on the target triggerable control, send a broadcast instruction to a preset software development kit to cause the software development kit to obtain the code information corresponding to the target triggerable control based on the broadcast instruction.

Further, based on any of the above embodiments, the processing module is configured to: in response to the triggering on the target triggerable control, obtain and display the code information corresponding to the target triggerable control based on the position of the code information of the function corresponding to the target triggerable control.

Further, based on any of the above embodiments, the apparatus further includes: the display module, which is further configured to display, in a fourth display area, an icon of function corresponding to the target control.

Further, based on any of the above embodiments, the processing module is configured to: in response to the triggering on any icon of function, display, in the second display area, the code information corresponding to the icon of the function.

Further, based on any of the above embodiments, the apparatus further includes: a modifying module configured to in response to a triggered code modification instruction, store modified code information to a preset storage path.

Further, based on any of the above embodiments, the apparatus further includes: a display module further configured to in response to an editing instruction triggered by a user, display a control editing interface corresponding to the target triggerable control on a display interface, the control editing interface including a property to be edited corresponding to the target triggerable control: a generating module configured to obtain editing data input in the control editing interface and generate an editing instruction based on the editing data; and a editing module configured to perform a property editing operation on the target triggerable control based on the editing instruction.

Another embodiment of the present disclosure further provides an electronic device including: at least one processor and a memory:

the memory stores a computer executable instruction; and the at least one processor executes the computer executable instruction stored in the memory, causing the at least one processor executes the method of displaying code of any of the above embodiments.

Another embodiment of the present disclosure further provides a computer-readable storage medium wherein the computer-readable storage medium stores thereon a computer executable instruction which, when executed by a processor, implement the method of displaying code of any of the above embodiments.

Another embodiment of the disclosure further provides a computer program product, including a computer program which, when executed by a processor, implement the method of displaying code of any of the above embodiments.

The device provided by the embodiment can be configured to execute the technical solution of the above method embodiments, the implementation principle and technical effect are similar, which are not elaborated in the embodiment.

Figure 9:
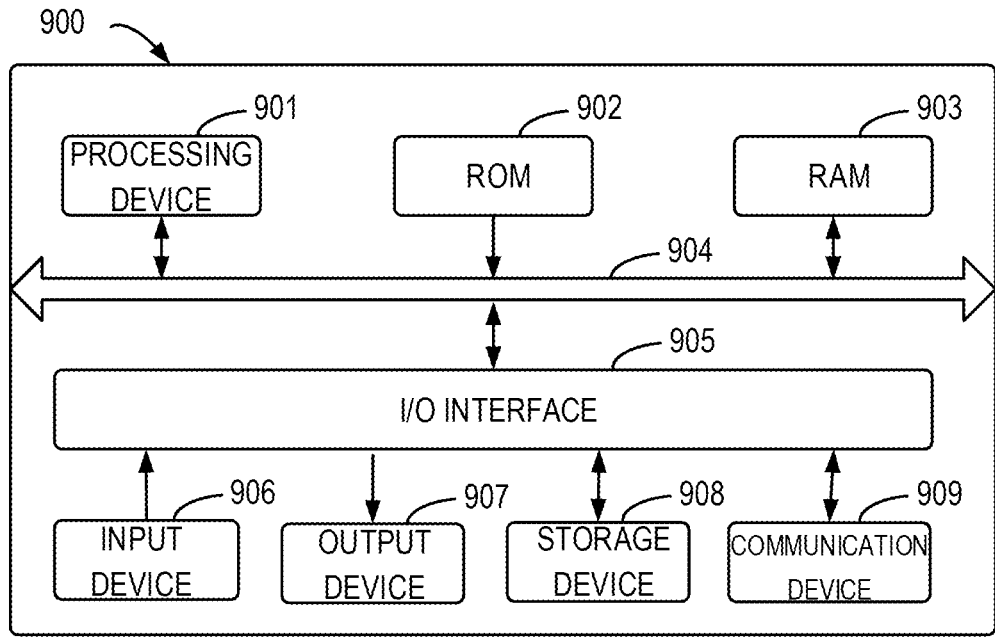
FIG. 9 is the structural schematic diagram of an electronic device provided by embodiment 4 of the present disclosure.

FIG. 9 is the structural schematic diagram of an electronic device provided by embodiment 4 of the present disclosure. As shown in FIG. 9, which shows a structural schematic diagram of the electronic device 900 suitable for implementing the present embodiment. The electronic device 900 may be a terminal device or a server. The terminal device may include, but is not limited to, a mobile terminal such as a mobile phone, a laptop computer, a digital broadcast receiver, a personal digital assistant (PDA), a tablet computer (Portable Android Device, PAD), a portable multimedia player (PMP), a vehicle-mounted terminal (for example, a vehicle-mounted navigation terminal), and the like, and a fixed terminal such as a digital TV, a desktop computer, and the like. The electronic device shown in FIG. 9 is merely an example and should not bring any limitation to the functions and scope of use of the embodiments of the present disclosure.

As shown in FIG. 9, the electronic device 900 may include a processing device (e.g., a central processing unit, a graphics processor, etc.) 901 that may perform various suitable actions and processing according to a program stored in a read only memory (Read Only Memory, ROM) 902 or a program loaded into a random access memory (Random Access Memory, RAM) 903 from a storage device 908. In the RAM 903, various programs and data which are necessary for the operation of the electronic device 900 are also stored. The processing apparatus 901, the ROM 902, and the RAM 903 are connected to one another via a bus 904. An input/output (I/O) interface 905 is also connected to the bus 904.

In general, the following devices may be connected to the I/O interface 905: an input device 906 including, for example, a touch screen, a touch pad, a key board, a mouse, a camera, a microphone, an accelerometer, a gyroscope, and the like: an output device 907 including, for example, a liquid crystal display (Liquid Crystal Display, LCD), a speaker, a vibrator, and the like: a storage device 908 including, for example, a magnetic tape, a hard disk, and the like; and a communication device 909. The communication device 909 may allow the electronic device 900 to exchange data with other devices in a wireless or wired communication. While FIG. 9 illustrates an electronic device 900 with a variety of devices, it should be understood that it is not required that all of the illustrated devices be implemented or provided. More or fewer devices may alternatively be implemented or provided.

In particular, the processes described above with reference to the flowcharts may be implemented as computer software programs according to the embodiments of the present disclosure. For example, the embodiments of the present disclosure include a computer program product including a computer program carried on a computer readable medium. The computer program includes program codes for executing the method as shown in the flowcharts. In such an embodiment, the computer program may be downloaded and installed from a network via the communication device 909, installed from the storage device 908, or installed from the ROM 902. When the computer program is executed by the processing device 901, the above described functions defined in the method embodiments of the present disclosure are executed.

It should be noted that, the computer readable medium in the present disclosure may be a computer readable signal medium or a computer readable storage medium, or any combination thereof. The computer readable storage medium may be, for example, but not limited to, an electronic, magnetic, optical, electromagnetic, infrared or semiconductor system, apparatus or device, or any suitable combination of the foregoing. More specific examples of the computer readable storage medium may include, but are not limited to, an electrical connection based on one or more wires, a portable computer diskette, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination of the foregoing. In the present disclosure, the computer readable storage medium may be any tangible medium that contains or stores a program for use by or in combination with an instruction execution system, apparatus or device. While in the present disclosure, the computer readable signal medium may include data signals propagated in a baseband or as part of a carrier wave, in which computer readable program codes are carried. Such propagated signals may take a variety of forms, including, but not limited to, an electro-magnetic signal, an optical signal, or any suitable combination thereof. The computer readable signal medium may also be any computer readable medium that is not a computer readable storage medium, and can send, propagate or transmit a program for use by or in combination with an instruction execution system, apparatus or device. Program codes contained on the computer readable medium may be transmitted using any appropriate medium, including, but not limited to, a wireline, an optical fiber cable, RF (radio frequency), etc., or any suitable combination of the foregoing.

The computer readable medium may be included in the electronic device, or may exist alone and not be installed in the electronic device.

The computer readable medium carries one or more programs, and when the one or more programs are executed by the electronic device, the electronic device is caused to execute the method shown in the foregoing embodiments.

Computer program codes for carrying out operations of the present disclosure may be written in one or more programming languages or any combination thereof, the programming languages including an object oriented programming language such as Java, Smalltalk, C++ and a conventional procedural programming language such as C programming language or similar programming languages. The program codes may be executed entirely on a user computer, executed partly on a user computer, executed as a stand-alone software package, executed partly on a user computer and partly on a remote computer, or executed entirely on a remote computer or server. In the scenario involving a remote computer, the remote computer may be connected to a user computer through any type of network, including a local area network (Local Area Network, LAN) or a wide area network (Wide Area Network, WAN), or may be connected to an external computer (for example, through the Internet of an Internet service provider).

The flowcharts and block diagrams in the accompanying drawings illustrate architectures, functionalities and operations of possible implementations of systems, methods and computer program products according to various embodiments of the present disclosure. In this regard, each block in the flowcharts or block diagrams may represent a module, a program segment, or a portion of code, which includes one or more executable instructions for implementing specified logical function(s). It should also be noted that, in some alternative implementations, the functions noted in the blocks may be implemented in an order different from those noted in the drawings. For example, two blocks shown in succession may, in fact, be executed substantially concurrently, or the blocks may sometimes be executed in the reverse order, depending upon the involved functionality. It should also be noted that, each block of the block diagrams and/or flowcharts and combinations of blocks in the block diagrams and/or flowcharts may be implemented by a special-purpose hardware-based system that performs specified functions or operations, or combinations of special-purpose hardware and computer instructions.

The units involved in the embodiments of the present disclosure may be implemented through software or hardware. The name of a unit does not constitute a limitation to the unit itself in some cases, for example, a first obtaining unit may also be described as "a unit that obtains at least two Internet protocol addresses".

The above functions described herein may be performed, at least in part, by one or more hardware logic components. For example, unrestrictedly, exemplary types of hardware logic components that can be used include: a Field Programmable Gate Array (FPGA), an Application Specific Integrated Circuit (ASIC), an Application Specific Standard Product (ASSP), a System on chip (SOC), a Complex Programmable Logic Device (CPLD), etc.

In the context of the present disclosure, a machine-readable medium may be a tangible medium that may contain or store a program for use by or in combination with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination of the foregoing. More specific examples of the machine-readable storage medium include an electrical connection based on one or more wires, a portable computer diskette, a hard disk, a random access memory (RAM), a read only memory (ROM), an erasable programmable read only memory (EPROM or flash memory), an optical fiber, a compact disc read only memory (CD-ROM), an optical storage device, a magnetic storage device, or any suitable combination of the foregoing.

In a first aspect, according to one or more embodiments of the present disclosure, a method of displaying code is provided, including:

in response to a triggering on a preset data processing control, displaying, in a preset first display area, a screenshot interface of current display content of a target application software to be analyzed, and displaying at least one triggerable control in the screenshot interface, the triggerable control corresponding to a target control in an interactive interface of the current display content of the target application software; and in response to a triggering on a target triggerable control, displaying, in a preset second display area, code information corresponding to the triggered target triggerable control, wherein the target triggerable control is any triggerable control in the at least one triggerable control.

According to one or more embodiments of the present disclosure, before in response to a triggering on a preset data processing control, displaying, in a preset first area, a screenshot interface of current display content of a target application software to be analyzed, and displaying at least one triggerable control in the screenshot interface, further including: in response to an analyzing instruction for the target application software to be analyzed, obtaining target code of the target application software.

According to one or more embodiments of the present disclosure, in response to a triggering on a preset data processing control, displaying, in a preset first display area, a screenshot interface of current display content of a target application software to be analyzed includes: in response to a triggering on a preset data processing control, obtaining the interactive interface of the current display content of the target application software and location information of the target control on the interactive interface; and displaying, in the preset first display area, the screenshot interface of the current display content of the target application software to be analyzed, and displaying the at least one triggerable control in the screenshot interface based on the interactive interface and the location information of the target control.

According to one or more embodiments of the present disclosure, after in response to a triggering on a target triggerable control, further including: displaying, in a preset third display area, at least one triggerable icon corresponding to the target triggerable control, the each triggerable icon corresponding to operation code of a preset type of the target triggerable control.

According to one or more embodiments of the present disclosure, in response to a triggering on a target triggerable control, displaying, in a preset second display area, code information corresponding to the triggered target triggerable control includes: in response to the triggering on the target triggerable control in the screenshot interface, displaying, in the preset second display area, the code information corresponding to the target triggerable control, or in response to a triggering on a target triggerable control, displaying, in a preset second display area, code information corresponding to the triggered target triggerable control includes: in response to the triggering on the target triggerable control in the screenshot interface, determining whether a target triggerable icon is triggered; and in response to a determination that the target triggerable icon is triggered, displaying, in the preset second display area, the operation code of the preset type corresponding to the target triggerable control, the target triggerable icon being associated with the preset type.

According to one or more embodiments of the present disclosure, the preset type one or more of a code declaration type, a click event type, or a layout file type.

According to one or more embodiments of the present disclosure, after in response to a triggering on a preset data processing control, further including: running a plurality of pieces of pre-embedded analyzing code based on the triggering operation; and determining position of code information of a triggerable function corresponding to respective triggerable controls by function call stack while running the plurality of pieces of analyzing code.

According to one or more embodiments of the present disclosure, in response to a triggering on a target triggerable control, displaying, in a preset second display area, code information corresponding to the triggered target triggerable control includes: in response to the triggering on the target triggerable control, sending a broadcast instruction to a preset software development kit to cause the software development kit to obtain the code information corresponding to the target triggerable control based on the broadcast instruction.

According to one or more embodiments of the present disclosure, in response to a triggering on a target triggerable control, displaying, in a preset second display area, code information corresponding to the triggered target triggerable control includes: in response to the triggering on the target triggerable control, obtaining and displaying the code information corresponding to the target triggerable control based on the position of the code information of the function corresponding to the target triggerable control.

According to one or more embodiments of the present disclosure, after in response to a triggering on a preset data processing control further including: displaying, in a fourth display area, an icon of function corresponding to the target control.

According to one or more embodiments of the present disclosure, the displaying, in a preset second display area, code information corresponding to the triggered target triggerable control includes: in response to the triggering on any icon of function, displaying, in the second display area, the code information corresponding to the icon of function.

According to one or more embodiments of the present disclosure, after in response to a triggering on a target triggerable control, displaying, in a preset second display area, code information corresponding to the triggered target triggerable control, further including: in response to a triggered code modification instruction, storing modified code information to a preset storage path.

According to one or more embodiments of the present disclosure, after in response to a triggering on any triggerable control, displaying, in the preset second display area, the code information corresponding to the triggered target triggerable control, further including: in response to a triggered editing instruction, displaying a control editing interface corresponding to the target triggerable control on a display interface, the control editing interface including a property to be edited corresponding to the target triggerable control: obtaining editing data input in the control editing interface and generating an editing instruction based on the editing data; and performing a property editing operation on the target triggerable control based on the editing instruction.

In a second aspect, according to one or more embodiments of the disclosure, an apparatus for processing and displaying code is provided, including:

a display module configured to display, in a preset first display area, a screenshot interface of current display content of a target application software to be analyzed, and display at least one triggerable control in the screenshot interface, the triggerable control corresponding to a target control in an interactive interface of the current display content of the target application software; and a processing module configured to in response to a triggering on a target triggerable control, display, in a preset second display area, code information corresponding to the triggered target triggerable control, wherein the target triggerable control is any triggerable control in the at least one triggerable control.

According to one or more embodiments of the present disclosure, the apparatus further includes: an obtaining module configured to in response to an analyzing instruction for the target application software to be analyzed, obtain target code of the target application software.

According to one or more embodiments of the present disclosure, the display module is configured to: in response to a triggering on a preset data processing control, obtain the interactive interface of the current display content of the target application software and location information of the target control on the interactive interface: display, in the preset first display area, the screenshot interface of the current display content of the target application software to be analyzed, and display the at least one triggerable control in the screenshot interface based on the interactive interface and the location information of the target control.

According to one or more embodiments of the present disclosure, the apparatus further includes: the display module further configured to display, in a preset third display area, at least one triggerable icon corresponding to the target triggerable control, the each triggerable icon corresponding to operation code of a preset type of the target triggerable control.

According to one or more embodiments of the present disclosure, the processing module is further configured to: in response to the triggering on the target triggerable control in the screenshot interface, display, in the preset second display area, the code information corresponding to the target triggerable control, or the processing module is further configured to: in response to the triggering on the target triggerable control in the screenshot interface, determine whether a target triggerable icon is triggered; and in response to a determination that the target triggerable icon is triggered, display, in the preset second display area, the operation code of the preset type corresponding to the target triggerable control, the target triggerable icon being associated with the preset type.

According to one or more embodiments of the present disclosure, the preset type includes one or more of a code declaration type, a click event type, or a layout file type.

According to one or more embodiments of the present disclosure, the apparatus further includes: a running module configured to run a plurality of pieces of pre-embedded analyzing code based on the triggering operation: a determining module configured to determine position of code information of a triggerable function corresponding to respective triggerable controls by function call stack while running the plurality of pieces of analyzing code.

According to one or more embodiments of the present disclosure, the processing module is configured to: in response to the triggering on the target triggerable control, send a broadcast instruction to a preset software development kit to cause the software development kit to obtain the code information corresponding to the target triggerable control based on the broadcast instruction.

According to one or more embodiments of the disclosure, the processing module is configured to: in response to the triggering on the target triggerable control, obtain and display the code information corresponding to the target triggerable control based on the position of the code information of the function corresponding to the target triggerable control.

According to one or more embodiments of the present disclosure, the device further includes: the display module further configured to display, in a fourth display area, an icon of function corresponding to the target control.

According to one or more embodiments of the disclosure, the processing module is configured to: in response to the triggering on any icon of function, display, in the second display area, the code information corresponding to the icon of function.

According to one or more embodiments of the present disclosure, the apparatus further includes: a modifying module configured to in response to a triggered code modification instruction, store modified code information to a preset storage path.

According to one or more embodiments of the present disclosure, the apparatus further includes: the display module further configured to in response to a triggered editing instruction, display a control editing interface corresponding to the target triggerable control on a display interface, the control editing interface including a property to be edited corresponding to the target triggerable control: a generating module configured to obtain editing data input in the control editing interface and generate an editing instruction based on the editing data; and an editing module configured to perform a property editing operation on the target triggerable control based on the editing instruction.

In a third aspect, according to one or more embodiments of the disclosure, an electronic device is provided, including: at least one processor and a memory:

the memory stores a computer executable instruction; and the at least one processor executes the computer executable instruction stored in the memory, causing the at least one processor executes the method of displaying code of the first aspect and various possible designs of the first aspect.

In a fourth aspect, according to one or more embodiments of the present disclosure, a computer-readable storage medium is provided. The computer-readable storage medium stores thereon a computer executable instruction which, when executed by a processor, implement the method of displaying code of the first aspect and various possible designs of the first aspect.

In a fifth aspect, according to one or more embodiments of the present disclosure, a computer program product is provided, including a computer program which, when executed by a processor, implement the method of displaying code of the first aspect and various possible designs of the first aspect.

In a sixth aspect, according to one or more embodiments of the present disclosure, a computer program is provided which, when executed by a processor, implement the method of displaying code of the first aspect and various possible designs of the first aspect.

The foregoing description is merely illustrative of the preferred embodiments of the present disclosure and of the technical principles applied thereto. It should be appreciated by a person skilled in the art that, the disclosure scope of the present disclosure is not limited to the technical solutions formed by specific combinations of the described technical features, and meanwhile should also cover other technical solutions formed by any combination of the described technical features or equivalent features thereof without departing from the described disclosed concept, for example, technical solutions formed by substituting the above features and technical features having similar functions as disclosed in the present disclosure (but not limited thereto) for one another.

In addition, while operations are depicted in a particular order, it should not be interpreted as that the operations need to be performed in a particular order as shown or in a sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented separately or in any suitable sub-combination.

Although the subject matter has been described in language specific to structural features and/or method logical acts, it should be understood that the subject matter defined in the appended claims is not necessarily limited to the specific features or acts described above. Rather, the specific features and acts described above are merely illustrative forms for implementing the claims.

What is claimed is:

1. A method of displaying code, comprising:
  displaying, in a first display area, a screenshot interface of current display content of an application software to be analyzed, and displaying at least one triggerable control in the screenshot interface, the at least one triggerable control corresponding to a first control in an interactive interface of the current display content of the application software, wherein the first control enables interactive operations on the current display content; and
  in response to a triggering on a first triggerable control, displaying, in a second display area, code information corresponding to the first triggerable control, wherein the first triggerable control is comprised in the at least one triggerable control.

2. The method of claim 1, before the displaying, in a first area, a screenshot interface of current display content of an application software to be analyzed, and displaying at least one triggerable control in the screenshot interface, further comprising:
  in response to an analyzing instruction for the application software to be analyzed, obtaining code of the application software.

3. The method of claim 1, wherein the displaying, in a first display area, a screenshot interface of current display content of an application software to be analyzed, and displaying at least one triggerable control in the screenshot interface comprises:
  in response to a triggering on a data processing control, obtaining the interactive interface of the current display content of the application software and location information of the first control on the interactive interface; and
  displaying, in the first display area, the screenshot interface of the current display content of the application software to be analyzed, and displaying the at least one triggerable control in the screenshot interface based on the interactive interface and the location information of the first control.

4. The method of claim 1, after in response to a triggering on a first triggerable control, further comprising:
  displaying, in a third display area, at least one triggerable icon corresponding to the first triggerable control, each of the at least one triggerable icon corresponding to operation code of a type of the first triggerable control.

5. The method of claim 4, wherein in response to a triggering on a first triggerable control, displaying, in a second display area, code information corresponding to the first triggerable control comprises:

in response to the triggering on the first triggerable control in the screenshot interface, displaying, in the second display area, the code information corresponding to the first triggerable control, or,
  in response to a triggering on a first triggerable control, displaying, in a second display area, code information corresponding to the first triggerable control comprises:
  in response to the triggering on the first triggerable control in the screenshot interface, determining whether a first triggerable icon is triggered; and
  in response to a determination that the first triggerable icon is triggered, displaying, in the second display area, the operation code of the type corresponding to the first triggerable control, the first triggerable icon being associated with the type.

6. The method of claim 4, wherein the type comprises one or more of a code declaration type, a click event type, or a layout file type.

7. The method of claim 1, before the displaying, in a first display area, a screenshot interface of current display content of an application software to be analyzed, and displaying at least one triggerable control in the screenshot interface, further comprising:
  running a plurality of pieces of pre-embedded analyzing code based on the triggering; and
  determining position of code information of a triggerable function corresponding to respective triggerable controls by function call stack while running the plurality of pieces of analyzing code.

8. The method of claim 7, wherein in response to a triggering on a first triggerable control, displaying, in a second display area, code information corresponding to the first triggerable control comprises:
  in response to the triggering on the first triggerable control, obtaining and displaying the code information corresponding to the first triggerable control based on the position of the code information of the function corresponding to the first triggerable control.

9. The method of claim 7, before the displaying, in a first display area, a screenshot interface of current display content of an application software to be analyzed, and displaying at least one triggerable control in the screenshot interface, further comprising:
  displaying, in a fourth display area, an icon of function corresponding to the first control.

10. The method of claim 9, wherein the displaying, in a second display area, code information corresponding to the first triggerable control comprises:
  in response to the triggering on any icon of function, displaying, in the second display area, the code information corresponding to the icon of function.

11. The method of claim 1, wherein in response to a triggering on a first triggerable control, displaying, in a second display area, code information corresponding to the first triggerable control comprises:
  in response to the triggering on the first triggerable control, sending a broadcast instruction to a software development kit to cause the software development kit to obtain the code information corresponding to the first triggerable control based on the broadcast instruction.

12. The method of claim 1, after in response to a triggering on a first triggerable control, displaying, in a second display area, code information corresponding to the first triggerable control, further comprising:
  in response to a triggered code modification instruction, storing modified code information to a storage path.

13. The method of claim 1, after in response to a triggering on any triggerable control, displaying, in the second display area, the code information corresponding to the first triggerable control, further comprising:

in response to a triggered editing instruction, displaying a control editing interface corresponding to the first triggerable control on a display interface, the control editing interface comprising a property to be edited corresponding to the first triggerable control;

obtaining editing data input in the control editing interface and generating an editing instruction based on the editing data; and performing a property editing on the first triggerable control based on the editing instruction.

14. An electronic device, comprising:

at least one processor and a memory;

wherein the memory stores a computer executable instruction; and wherein the at least one processor executes the computer executable instruction stored in the memory, causing the at least one processor to implement a method comprising:

displaying, in a first display area, a screenshot interface of current display content of an application software to be analyzed, and displaying at least one triggerable control in the screenshot interface, the at least one triggerable control corresponding to a first control in an interactive interface of the current display content of the application software, wherein the first control enables interactive operations on the current display content; and in response to a triggering on a first triggerable control, displaying, in a second display area, code information corresponding to the first triggerable control, wherein the first triggerable control is comprised in the at least one triggerable control.

15. The electronic device of claim 14, before the displaying, in a first area, a screenshot interface of current display content of an application software to be analyzed, and displaying at least one triggerable control in the screenshot interface, further comprising:

in response to an analyzing instruction for the application software to be analyzed, obtaining code of the application software.

16. The electronic device of claim 14, wherein the displaying, in a first display area, a screenshot interface of current display content of an application software to be analyzed, and displaying at least one triggerable control in the screenshot interface comprises:

in response to a triggering on a data processing control, obtaining the interactive interface of the current display content of the application software and location information of the first control on the interactive interface; and displaying, in the first display area, the screenshot interface of the current display content of the application software to be analyzed, and displaying the at least one triggerable control in the screenshot interface based on the interactive interface and the location information of the first control.

17. The electronic device of claim 14, after in response to a triggering on a first triggerable control, further comprising:

displaying, in a third display area, at least one triggerable icon corresponding to the first triggerable control, each of the at least one triggerable icon corresponding to operation code of a type of the first triggerable control.

18. The electronic device of claim 17, wherein in response to a triggering on a first triggerable control, displaying, in a second display area, code information corresponding to the first triggerable control comprises:

in response to the triggering on the first triggerable control in the screenshot interface, displaying, in the second display area, the code information corresponding to the first triggerable control, or, in response to a triggering on a first triggerable control, displaying, in a second display area, code information corresponding to the first triggerable control comprises:

in response to the triggering on the first triggerable control in the screenshot interface, determining whether a first triggerable icon is triggered; and in response to a determination that the first triggerable icon is triggered, displaying, in the second display area, the operation code of the type corresponding to the first triggerable control, the first triggerable icon being associated with the type.

19. The electronic device of claim 17, wherein the type comprises one or more of a code declaration type, a click event type, or a layout file type.

20. A non-transitory computer-readable storage medium, wherein the computer-readable storage medium stores thereon a computer executable instruction which, when executed by a processor, implements a method comprising:

displaying, in a first display area, a screenshot interface of current display content of an application software to be analyzed, and displaying at least one triggerable control in the screenshot interface, the at least one triggerable control corresponding to a first control in an interactive interface of the current display content of the application software, wherein the first control enables interactive operations on the current display content; and in response to a triggering on a first triggerable control, displaying, in a second display area, code information corresponding to the first triggerable control, wherein the first triggerable control is comprised in the at least one triggerable control.

* * * * *